Patented Dec. 6, 1938

2,139,400

UNITED STATES PATENT OFFICE 2,139,400

PROCESS OF PREPARING PICRIC ACID COMPOUNDS

John C. Bird, Montclair, N. J., assignor to John Wyeth & Brother, Incorporated, Philadelphia, Pa., a corporation of Delaware No Drawing. Application February 28, 1935, Serial No. 8,777

6 Claims. (Cl. 260—430)

This invention relates to improvements in the preparation of compounds of picric acid, and particularly of silver picrate. It is a continuation in part of my prior application Serial No. 724,825, filed May 9, 1934.

The compounds of picric acid such as its organic ethers and the metal picrates, more particularly silver picrate, have valuable medicinal and antiseptic preparations. However, in the preparation of such compounds for use or for dispensing, for example, in aqueous solution, the low solubility of the metal picrates and particularly of silver picrate makes the preparation of materials containing such compounds difficult and expensive, since concentrated solutions cannot be readily prepared or employed. Thus, silver picrate is soluble in water only to the extent of about 1% and to secure even this low solubility, the application of moderate heat is necessary. Some of these compounds, particularly the silver compound, are unstable in aqueous solution, even in the dark, eventually decomposing with the formation of silver oxide, metallic silver and the like. Such solutions, which are necessarily dilute, are thus wholly unadapted for storage, pharmaceutical application or for economical commercial use.

In accordance with this invention, it has been found that silver picrate has a high solubility in the lower monoalkyl ethers of diethylene glycol, and particularly the methyl, ethyl, propyl, and butyl mono-ethers. The solubility of silver picrate is highest in the monoethyl ether, reaching as much as 50%. It is somewhat lower in the other lower monoalkyl ethers, being for example, about 25% in the mono-methyl ether. In general, the monoethyl ether of diethylene glycol is preferred as the solvent. Furthermore, as these solutions are non-aqueous, the solutes do not readily undergo hydrolysis or decomposition. It is preferable that these solutions be not exposed to light for long periods. Solutions in the mono-butyl ether appear to darken more readily than those in the other solvent ethers.

Such solutions containing in excess of 1% of the picrate, may be readily prepared directly from silver picrate and the monoethyl ether referred to when silver picrate is obtainable. However, the high solubility of silver picrate in the monoalkyl ethers above referred to provides a ready means for the production of the compound directly in the presence of the said monoalkyl ethers, for example, from silver oxide, silver hydroxide or carbonate and picric acid. For example, such a solution may be readily made as follows:

Silver oxide, which may be procured as such or prepared by precipitation from aqueous solution of silver nitrate by an alkali with subsequent careful washing, in substantially dry form, is thoroughly mixed with a selected solvent monoalkyl ether of diethylene glycol, for example, diethylene glycol monoethyl ether, in a suitable container. The container and any mechanical devices that are employed in connection with the manufacture are preferably of non-metallic inert materials such as glass, enamel or wood.

Picric acid is now added to the mixture of the silver oxide and the ether, the proportions being so controlled that there is a slight excess of silver oxide. The mixture is preferably warmed, say to about 90° C. Rapid reaction takes place and silver picrate forms and goes into solution and when the reaction is completed, the solution is neutral or very slightly alkaline with a faint turbidity due to the slight excess of silver oxide. The solution is then filtered and cooled. While solutions containing a concentration of silver picrate up to 50% may be thus prepared, I prefer to control the proportions of the solvent and of the reagents so that the final solution has a silver picrate concentration of about 20% for convenience in dispensing.

If this solution is to be dispensed as such, it may conveniently be filled into suitable containers or ampoules, each containing about five grams of the solution and therefore containing the equivalent of one gram of silver picrate. The solution thus dispensed may be conveniently employed in the preparation of aqueous solutions containing up to 1% of silver picrate, at the convenience and according to the desires of the dispenser.

The method hereinbefore described may be conveniently employed as a step in the production of silver picrate in solid or crystalline form. For such purpose, the proportions of the monoalkyl ether solvent are preferably controlled so that a more concentrated solution is obtained, between 20 and 50%. After this solution has been filtered, the silver picrate may be caused to crystallize out by the addition of water. Thus with the more concentrated solutions of silver picrate in the monoethyl ether, on the addition of water, preferably up to about twice the amount in volume of the picrate solutions, the silver picrate rapidly crystallizes out in shining golden yellow needles. These crystals are filtered off or drained from excess solvent, washed with ice water and dried. More dilute solutions of the silver picrate may be employed, if desired, but in general the more concentrated solutions are preferred when solid silver picrate is to be prepared.

The solutions of silver picrate in a diethylene glycol monoalkyl ether, and particularly the monoethyl ether, may be employed in the preparation of other compounds of picric acid, such as other metallic picrates or ethers of picric acid. This may be effected by causing the silver picrate, in the diethylene glycol monoalkyl ether solution to react upon a metallic halide or an organic halide such as the simple hydrocarbon halides having alkyl, aryl, alkaryl and cyclic radicals.

I claim:

1. The method of preparing a solution of silver picrate which comprises reacting upon silver oxide with picric acid in the presence of a lower monoalkyl ether of diethylene glycol.

2. The method of preparing crystalline silver picrate which comprises adding water to a solution of silver picrate in a diethylene glycol monoalkyl ether solvent.

3. The method of preparing crystalline silver picrate which comprises reacting upon silver oxide with picric acid in the presence of diethylene glycol monoethyl ether, separating the resulting solution from any insoluble residue, adding water thereto, thereby causing separation of silver picrate crystals, and filtering the crystals from excess solvent.

4. The method of preparing a solution of silver picrate which comprises reacting a compound of the class consisting of the oxide, hydroxide and carbonate of silver with picric acid in the presence of a lower monoalkyl ether of diethylene glycol.

5. The method of preparing a solution of silver picrate which comprises reacting a compound of the class consisting of the oxide, hydroxide and carbonate of silver with picric acid in the presence of diethylene glycol monoethyl ether.

6. The method of preparing crystalline silver picrate which comprises reacting a compound of the class consisting of the oxide, hydroxide and carbonate of silver with picric acid in the presence of diethylene glycol monoethyl ether, separating the resulting solution from any insoluble residue, adding water thereto, thereby causing separation of silver picrate crystals, and filtering crystals from excess solvent.

JOHN C. BIRD.